United States Patent
Bangalore et al.

(10) Patent No.: US 7,630,917 B2
(45) Date of Patent: Dec. 8, 2009

(54) AUTOMATIC LEARNING FOR MAPPING SPOKEN/TEXT DESCRIPTIONS OF PRODUCTS ONTO AVAILABLE PRODUCTS

(75) Inventors: Srinivas Bangalore, Morristown, NJ (US); Giuseppe Di Fabbrizio, Florham Park, NJ (US); Narendra Kumar Gupta, Dayton, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 440 days.

(21) Appl. No.: 11/279,802

(22) Filed: Apr. 14, 2006

(65) Prior Publication Data

US 2007/0250404 A1    Oct. 25, 2007

(51) Int. Cl.
G06F 17/30 (2006.01)
G06Q 10/00 (2006.01)

(52) U.S. Cl. .................... 705/10; 705/1; 705/4

(58) Field of Classification Search ............ 705/1, 705/4, 10
See application file for complete search history.

(56) References Cited

U.S. PATENT DOCUMENTS

| | | | | |
|---|---|---|---|---|
| 5,515,269 A * | 5/1996 | Willis et al. | ............... | 705/29 |
| 5,796,614 A * | 8/1998 | Yamada | ............... | 700/106 |
| 5,799,286 A * | 8/1998 | Morgan et al. | ............... | 705/30 |
| 5,924,077 A * | 7/1999 | Beach et al. | ............... | 705/10 |
| 5,963,953 A * | 10/1999 | Cram et al. | ............... | 707/102 |
| 5,983,220 A * | 11/1999 | Schmitt | ............... | 707/5 |
| 6,266,655 B1 * | 7/2001 | Kalyan | ............... | 705/400 |
| 6,311,178 B1 * | 10/2001 | Bi et al. | ............... | 707/3 |
| 6,321,133 B1 * | 11/2001 | Smirnov et al. | ............... | 700/100 |
| 6,377,937 B1 * | 4/2002 | Paskowitz | ............... | 705/26 |
| 6,408,263 B1 * | 6/2002 | Summers | ............... | 703/6 |
| 6,519,571 B1 * | 2/2003 | Guheen et al. | ............... | 705/14 |
| 6,633,852 B1 * | 10/2003 | Heckerman et al. | ............... | 705/27 |
| 6,643,639 B2 * | 11/2003 | Biebesheimer et al. | ............... | 707/3 |
| 6,708,174 B1 * | 3/2004 | Tenorio | ............... | 707/10 |
| 6,728,691 B1 * | 4/2004 | Neuneier et al. | ............... | 706/30 |
| 6,826,538 B1 * | 11/2004 | Kalyan et al. | ............... | 705/7 |
| 6,871,182 B1 * | 3/2005 | Winnard et al. | ............... | 705/7 |
| 6,898,580 B1 * | 5/2005 | Curran et al. | ............... | 705/400 |
| 6,944,598 B1 * | 9/2005 | Cline | ............... | 705/28 |
| 6,948,144 B1 * | 9/2005 | Teig et al. | ............... | 716/12 |
| 6,957,431 B2 * | 10/2005 | Bollella et al. | ............... | 718/100 |
| 6,970,841 B1 * | 11/2005 | Cheng et al. | ............... | 705/28 |
| 6,981,040 B1 * | 12/2005 | Konig et al. | ............... | 709/224 |
| 7,047,512 B1 * | 5/2006 | Teig et al. | ............... | 716/12 |
| 7,085,729 B1 * | 8/2006 | Kennedy et al. | ............... | 705/10 |
| 7,103,567 B2 * | 9/2006 | Smukowski | ............... | 705/26 |
| 7,246,078 B2 * | 7/2007 | Vincent | ............... | 705/10 |
| 7,246,338 B1 * | 7/2007 | Teig et al. | ............... | 716/12 |
| 7,263,496 B1 * | 8/2007 | Weigelt et al. | ............... | 705/10 |

(Continued)

Primary Examiner—Matthew S Gart
Assistant Examiner—Ashford S Hayles (57) ABSTRACT

A method, processing device, and machine-readable medium are provided. Costs of states of a state space are calculated. Each state represent one or more available product attributes having zero or more decided attribute values. The calculating is based, at least in part, on training data associated with previously requested and offered products. determining a next state such that one or more products are available and a sum of values, including a cost of a next state and a cost of a perturbation of one of the one or more requested product attribute values to reach the next state is a minimum value. A value for a product attribute is mapped according to the minimum sum of values and product attribute values of available products.

16 Claims, 4 Drawing Sheets

U.S. PATENT DOCUMENTS

| | | | |
|---|---|---|---|
| 7,376,578 B1 * | 5/2008 | Kalyan | 705/10 |
| 2002/0065699 A1 * | 5/2002 | Talluri | 705/8 |
| 2003/0065586 A1 * | 4/2003 | Shaftel et al. | 705/27 |
| 2003/0217252 A1 * | 11/2003 | Gupta et al. | 713/1 |
| 2004/0039622 A1 * | 2/2004 | Masiello et al. | 705/8 |
| 2004/0230397 A1 * | 11/2004 | Chadwick | 702/181 |
| 2006/0059032 A1 * | 3/2006 | Wong et al. | 705/10 |
| 2006/0195345 A1 * | 8/2006 | Close et al. | 705/7 |

* cited by examiner

AUTOMATIC LEARNING FOR MAPPING SPOKEN/TEXT DESCRIPTIONS OF PRODUCTS ONTO AVAILABLE PRODUCTS

BACKGROUND OF THE INVENTION

1. Field of the Invention

The present invention relates to automatically mapping a description of a product to an available product and more specifically to a system and method for learning how to map a product having one or more requested attribute values to an available product.

2. Introduction

For electronic commerce, a retailer may keep descriptions of products in a structured repository. Customers may browse the repository using a web interface, such as, for example, an Internet browser. When a system is configured to receive speech or text input, customers may describe products they wish to purchase in a manner that may not exactly match a product described in the repository. For example, a customer may describe a product such as brown Bass brand shoes of size 10. In a conventional system, the customer may only be presented with information about products that exactly match the customer's description. If a product that exactly matches the customer's description is not available, then the customer may not be presented with any product information. Thus, product information with respect to a product which is available and which the customer may purchase, such as, for example, a dark brown Bass brand shoe of size 10, will not be presented to the customer. Thus, the retailer loses a possible sale.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method is provided for learning to map requested attribute values onto product attribute values of available products. Costs of states of a state space are calculated. Each state represent one or more available product attributes having zero or more decided attribute values. The calculating is based, at least in part, on training data associated with previously requested and offered products. Determining a next state of the state space such that one or more products are available and a sum of values, including a cost of a next state and a cost of a perturbation of one of the one or more requested product attribute values to reach the next state is a minimum value. A value for a product attribute is mapped according to the minimum sum of values and product attribute values of available products.

In a second aspect of the invention, a machine-readable medium having recorded thereon instructions is provided. The machine-readable medium includes instructions for calculating a cost of a group of states of a state space, where each of the group of states represents one or more available product attributes having decided values, and the calculating is based, at least in part, on training data that associated with previously requested and offered products. The machine-readable medium further includes instructions for determining a next state of the state space such that one or more products are available and a sum of values, including a cost of the next state and a cost of a perturbation of one of the one or more requested product attribute values to reach the next state is a minimum value, and instructions for mapping a value for a product attribute based on a minimum sum of values and product attribute values of available products.

In a third aspect of the invention, a processing device is provided. The processing device includes at least one processor, a storage device including information with respect to a group of products, where the storage device is accessible by the at least one processor, and a memory operatively connected to the at least one processor. The processing device is configured to calculate a cost of a group of states of a state space, where each of the group of states represents one or more available product attributes having decided values, and the calculating is based, at least in part, on training data associated with previously requested and offered products. The processing device is further configured to determine a next state of the state space such that one or more products are available and a sum of values, including a cost of the next state and a cost of a perturbation of one of the one or more requested product attribute values to reach the next state is a minimum value, and map a value for a product attribute according the minimum sum of values and product attribute values of available products.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary System

Figure 1:
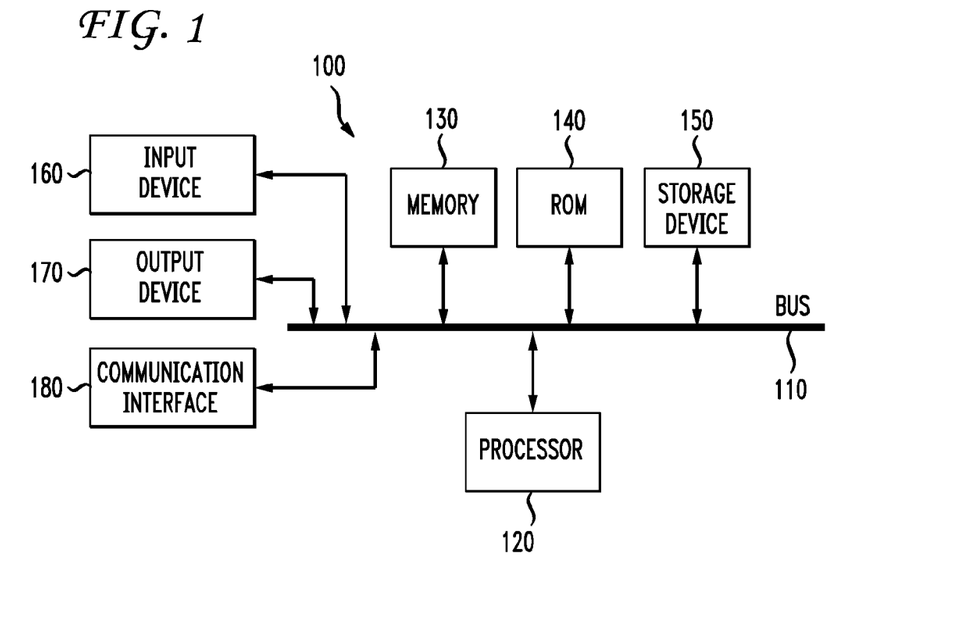
FIG. 1 illustrates an exemplary processing device in which implementations consistent with principles of the invention may execute.

FIG. 1 illustrates a block diagram of an exemplary processing device 100 which may be used to implement systems and methods consistent with the principles of the invention. Processing device 100 may include a bus 110, a processor 120, a memory 130, a read only memory (ROM) 140, a storage device 150, an input device 160, an output device 170, and a communication interface 180. Bus 110 may permit communication among the components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive. In some implementations, storage device 150 may include a database.

Input device 160 may include one or more conventional mechanisms that permit a user to input information to system 200, such as a keyboard, a mouse, a pen, a voice recognition device, a microphone, a headset, etc. Output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

Processing device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Processing device 100 may be, for example, a personal computer (PC), or any other type of processing device capable of processing textual or voice data. In alternative implementations, such as, for example, a distributed processing implementation, a group of processing devices 100 may communicate with one another via a network such that various processors may perform operations pertaining to different aspects of the particular implementation.

OVERVIEW

A customer may access a processing device, such as, for example, processing device 100 in a number of different ways. In one implementation, the customer may access processing device 100 using a browser via a network, such as, for example, the Internet. In another implementation, the customer may access processing device 100 via a telephone and may provide speech input to processing device 100. In a third implementation, the customer may access processing device 100 directly via a workstation directly connected to processing device 100.

Once, the customer accesses processing device 100, the customer may provide, as input, one or more requested product attribute values of a product that the customer is interested in purchasing. For example, if the customer is interested in purchasing shoes, the customer may provide requested product attribute values, such as Bass shoes, brown color, size 10. Processing device 100 may then search a product database for a product having the requested product attributes. If one or more products having the requested attribute values is available, then the customer may be presented with information describing the one or more products. However, if no available product can be found that has all of the requested attributes. Processing device 100 may present the customer with information about similar available products. Processing device 100 may determine which available products may interest the customer based on training data including information from previous customer requests. The information may include requested product attribute values $R_n=\{r_1, r_2, \ldots r_n\}$, where n is a number of attributes, offered product attribute values $O_n=\{o_1, o_2, \ldots o_n\}$ of an available product, and information with respect to whether a customer purchased the available product.

In implementations consistent with the principles of the invention selection of available products may be done by incrementally deciding the value of each product attribute. In doing so, the requested attribute values may be perturbed. More specifically selection may be done by searching a "state space". States in this space may represent decided attributes of the product. To enable the search, costs may be assigned to each state and to each perturbation that allows transition from one state to another. Computation of these costs may be based, at least in part, on the above-mentioned training data. Starting from an initial state, where no decisions are made, the procedure may repeatedly transition to a next state by deciding a value of an attribute, possibly by perturbing a requested attribute value, such that total cost of perturbation and the cost of a next state is a minimum amount. In doing so attribute values of a product in the database may be used to perturb the requested attribute values.

State Space

Figure 2:
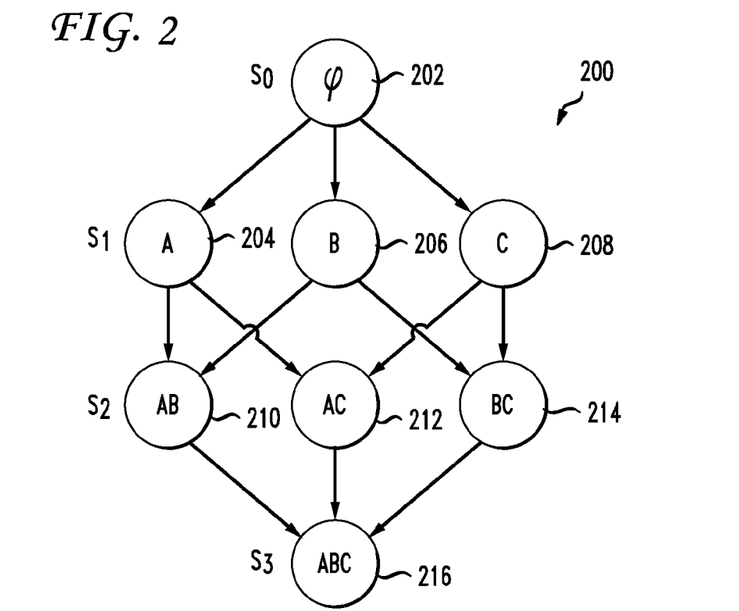
FIG. 2 illustrates an exemplary state space for a product having three attributes.

Implementations consistent with the principles of the invention may determine a cost of each state of a state space. FIG. 2 illustrates an exemplary state space 200 for three product attributes. State space 200 may include one or more states having no decided attribute values, $S_0=\{202\}$, one decided attribute value, $S_1=\{204, 206, 208\}$, two decided attribute values, $S_2=\{210, 212, 214\}$, and three decided attribute values, $S_3=\{216\}$. State space 200 is an exemplary state space. Other state spaces may have more of fewer product attributes.

State 202 may represent a starting point, or initial state, in which no attribute values have been decided. State 204 may represent a state in which a value for attribute A is decided. State 206 may represent a state in which a value for attribute B is decided. State 208 may represent a state in which a value for attribute C is decided. State 210 may represent a state in which values for attributes A and B are decided. State 212 may represent a state in which values for attributes A and C are decided. State 214 may represent a state in which values for attributes B and C are decided. State 214 may represent a state in which values for attributes A, B and C are decided.

The cost of a state may be calculated by summing an average cost of deciding an attribute value for remaining undecided attributes. Thus, a cost of state 204, in which a value for attribute A is decided, may equal a sum of an average cost of deciding a value of product attribute B and an average cost of deciding a value of product attribute C.

For example, the cost of state 210, in which attributes A and B are decided may be the average cost of deciding remaining attributes, which in this case is attribute C. This can best be shown by way of an example. In this example, assume that a product, shoes, is being offered for sale and product attribute A corresponds to brand, product attribute B corresponds to color, and product attribute C corresponds to size. In state 210, attributes A (brand) and B (color) are decided. The remaining undecided attribute is size. Thus, the cost of deciding a value for attribute C may be calculated from training data, which may include a set of requested attribute values (three for this example) $R_3=\{r_1, r_2, r_3\}$, a set of offered attribute values (three for this example) $O_3=\{o_1, o_2, o_3\}$, and information indicating whether the requesting consumer purchased the offered item. Each attribute may have a perturbation operator. For a numerical value, such as size, a set of perturbation operators may be, for example, {increase, decrease, same} indicating that an offered attribute value may be, for example, a half size higher than, a half size lower than, and the same size, respectively, as a requested size. For other attributes, such as color, a set of perturbation operators may be values, such as, for example, {black, brown, tan, dark brown, white, cordovan}.

For the sake of this example, assume that the training data has data for one hundred shoe transactions and that sixty of the transactions indicate that consumers requested and were offered the same size shoe and in each of these sixty transactions, respective consumers purchased the product. Then, the probability of making a sale when deciding a value of attribute C that is equal to a requested size is $$\frac{60}{60} = 1.$$

Further, for this example, assume that according to the training data, in thirty transactions respective consumers was offered a half size larger than a requested size and 15 of these transactions resulted in a sale. Thus, the probability of making a sale when deciding a value of attribute C that is a half size larger than the requested size is $$\frac{15}{30} \text{ or } 0.5.$$

Further, assume that in ten transactions, respective consumers requested a size and were offered a size a half size smaller than what was requested. In these ten transaction in the training data, only one resulted in a sale. Thus, the probability of making a sale when offering a shoe that is a half size smaller than a requested size is $$\frac{1}{10} \text{ or } 0.1.$$

From the calculated probabilities, a cost of deciding an attribute value may be calculated according to a formula:

$$c_i^k = -\log(p(q_i^k)) \qquad \text{Equation 1}$$

where $c_i^k$ is a cost of deciding a value of an $i^{th}$ attribute according to a $k^{th}$ perturbation of a requested attribute value, $q_i^k$ is a $k^{th}$ perturbation of an $i^{th}$ attribute value, and $p(q_i^k)$ is a probability of selling a product having a value of an $i^{th}$ attribute perturbed according to a $k^{th}$ perturbation. Thus, according to the training data, the cost of selling a shoe having the same size as a requested shoe may be $-\log(1)=0$, the cost of selling a shoe that is a half size larger than a requested size may be $-\log(0.5)=0.3010$, and the cost of selling a shoe that is half a size smaller than a requested size may be $-\log(0.1)=1$. The average cost of deciding a value of an $i^{th}$ attribute may then be determined according to a formula:

$$\text{average cost of deciding attribute } i = \frac{\sum_{k=1}^{n}(N_k \times c_i^k)}{\sum_{k=1}^{n} N_k}, \qquad \text{Equation 2}$$

where $N_k$ is a number of transactions with respect to perturbation operator k and $c_i^k$ is the cost of deciding attribute i with respect to the $k^{th}$ perturbation. Applying equation 2 to the above shoe example, the average cost of deciding a value for attribute C is $$\frac{60 \times 0 + 30 \times 0.3010 + 10 \times 1}{60 + 30 + 10} = 0.1903$$

Figure 3:
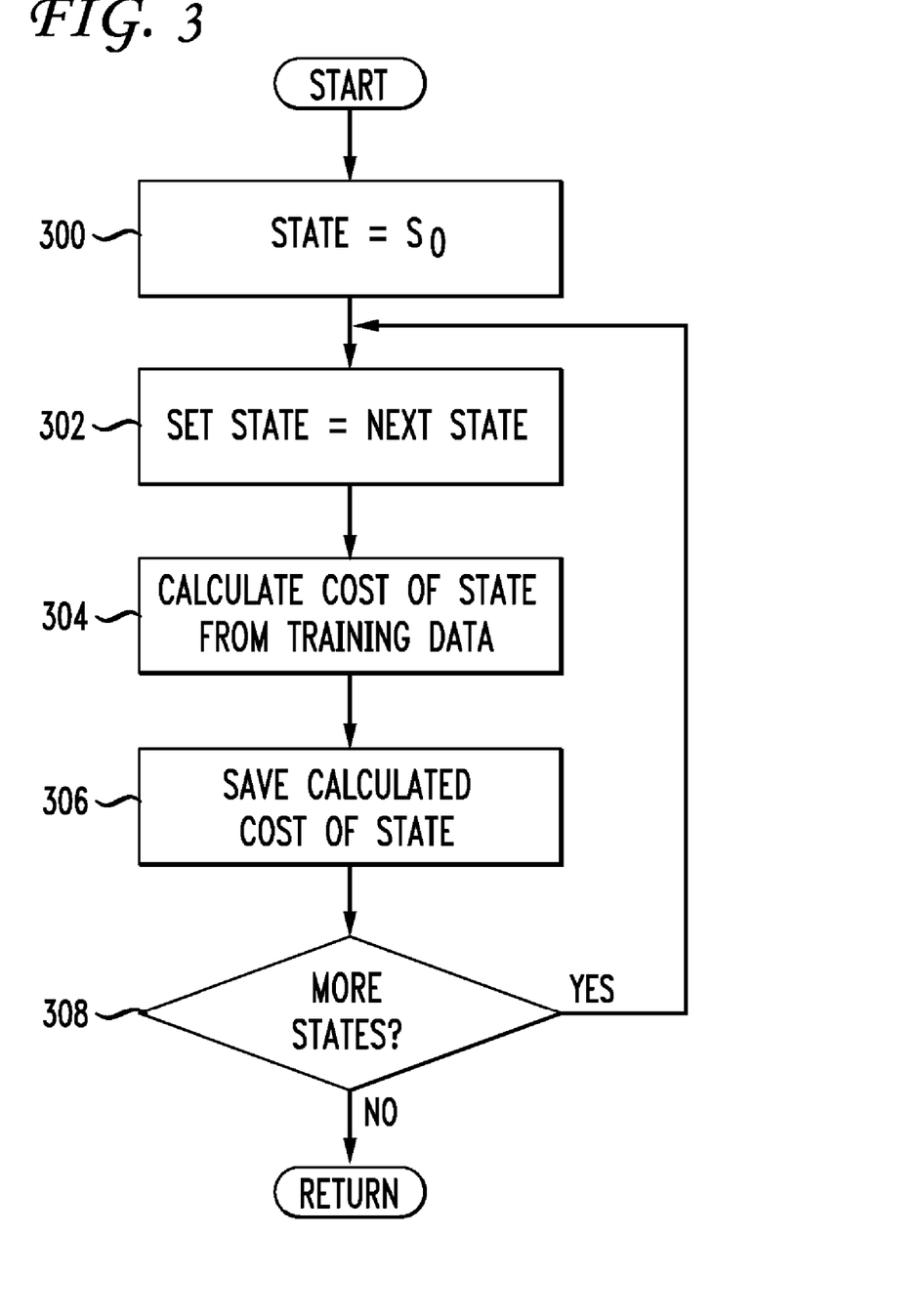
FIG. 3 illustrates a flowchart of an exemplary process for calculating costs of states of a state space.

FIG. 3 illustrates a flowchart that explains processing for determining costs of states in implementations consistent with the principles of the invention. The process may begin with processing device 100 setting a state to an initial state, $S_0$, indicating a state in which no attributes have decided values (act 300). Next, processing device 100 may set the state to a next state, for example, state 204 (see FIG. 2) (act 302). Processing device 100 may then calculate a cost of the state from training data (act 304). For example, the cost of state 204 may be calculated as a sum of the average cost of deciding attribute B and the average cost of deciding attribute C. This may be calculated according to equations 1 and 2, above. After calculating the cost of the state, the cost may be saved for future use in determining what attribute values to offer to a consumer (act 306), as will be described below. Processing device 100 may then determined whether there are additional states in the state space (act 308). If processing device 308 determines that there are additional states in the state space, then processing device 100 may again perform acts 302-308. Otherwise, the process is completed. In implementations consistent with the principles of the invention, the above-described process of FIG. 3 may be performed once, using the training data, and the respective costs of states saved for use in determining which product attribute values to offer to consumers.

State Space Searching

A consumer may provide a set of requested product attribute values, $R_n$, for a desired product, such as, for example, shoes, or other products. Processing device 100 may decide which values of attributes to offer, $O_n$, to the consumer based on cost. In implementations consistent with the principles of the invention, processing device 100 may offer product attribute values, $O_n$, such that the cost is at a minimum and a product having the offered attribute values is available. Assuming that a consumer will always purchase a product having offered product attribute values, $O_n$, equal to requested product attribute values, $R_n$, one can see from equation 1, that the cost in such a case would be 0.

Figure 4:
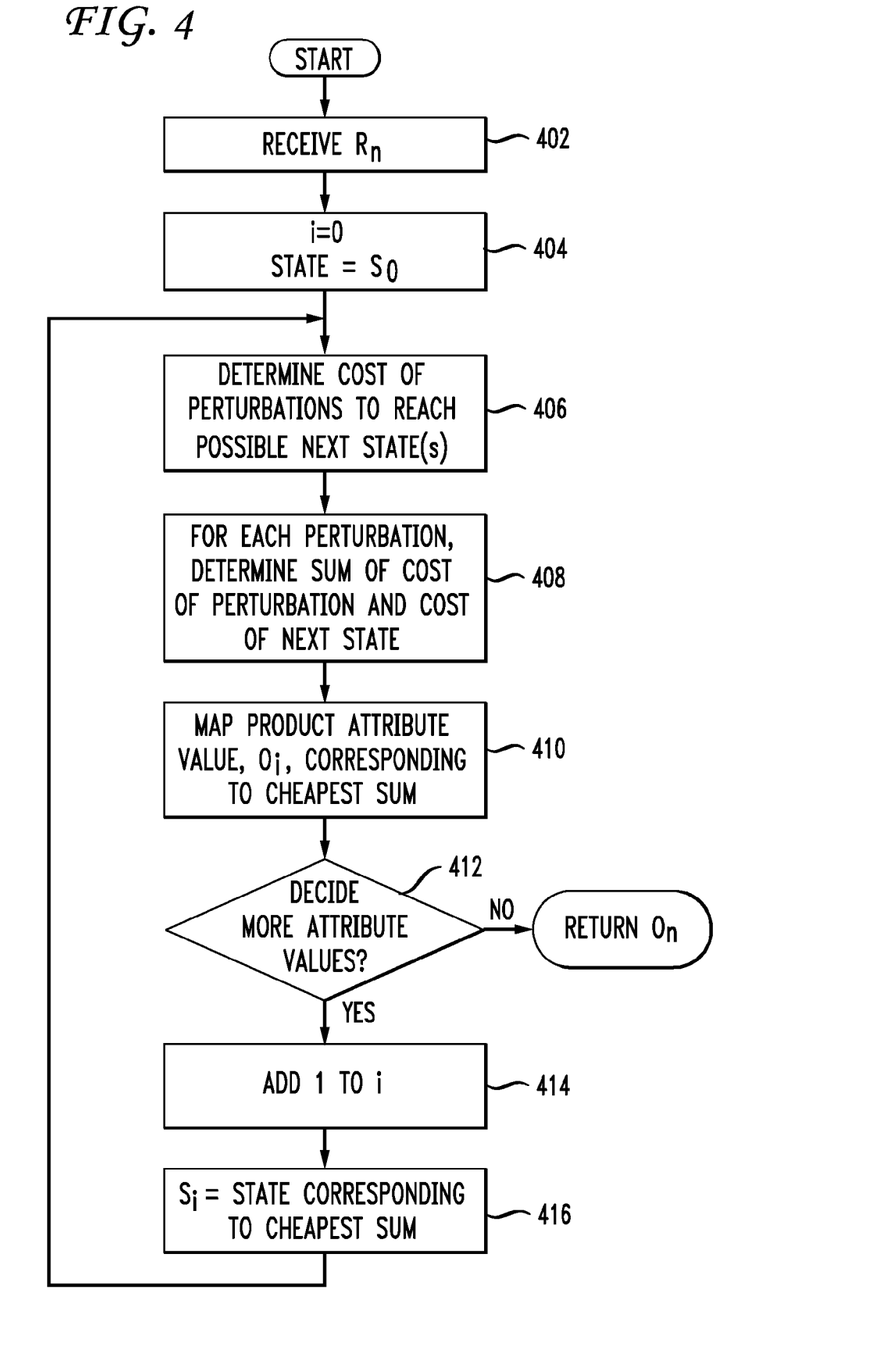
FIG. 4 illustrates an exemplary process for mapping requested product attributes to product attributes of available products in one implementation consistent with the principles of the invention.

FIG. 4 is a flowchart of an exemplary process that may be performed in implementations consistent with the principles of the invention. Processing device 100 may begin by receiving requested attribute values, $R_n$, for a desired product (act 402). Processing device 100 may then set a counter, i, indicating a number of decided attribute, to 0 and an initial state to $S_0$ (act 404).

Next, processing device 100 may determine a cost of perturbations to reach all possible next states (act 406). For example, if the current state is $S_0=202$, then the set of possible next states is $S_1=\{204, 206, 208\}$. The cost may be determined based on the training data as explained above, with respect to the shoe example. After determining the cost of a respective perturbation to reach one of the next possible states, processing device 100 may then determine a sum of the cost of the respective perturbation with a cost of the corresponding next state (act 408). In one implementation, the cost of each state may be previously calculated, as explained with respect the flowchart of FIG. 3 and saved for use with the process of FIG. 4. Processing device 100 may then map a requested product attribute, $r_i$, to an offered product attribute value, $o_i$, corresponding to the cheapest sum or total cost, and for which one or more products are available (act 410).

Processing device 100 may then determine whether any additional product attributes values remain to be decided (act 412). If processing device 100 determines that no additional product attribute values remain to be decided, then a set of offered attribute values, $O_n=\{o_1, o_2, \ldots, o_n\}$ are selected and products having attribute values $O_n$ may be offered. Otherwise, 1 is added to i, indicating that an attribute value has been decided (act 414) and the current state, $S_i$, may be set the state corresponding to the cheapest sum or total cost for which one or more products are available (act 416). Processing device 100 may then repeat acts 406-416 until all attribute values are decided. In this way, a cheapest path through the state space is selected based on requested attribute values, $R_n$, the training data, and available products.

Figure 5:
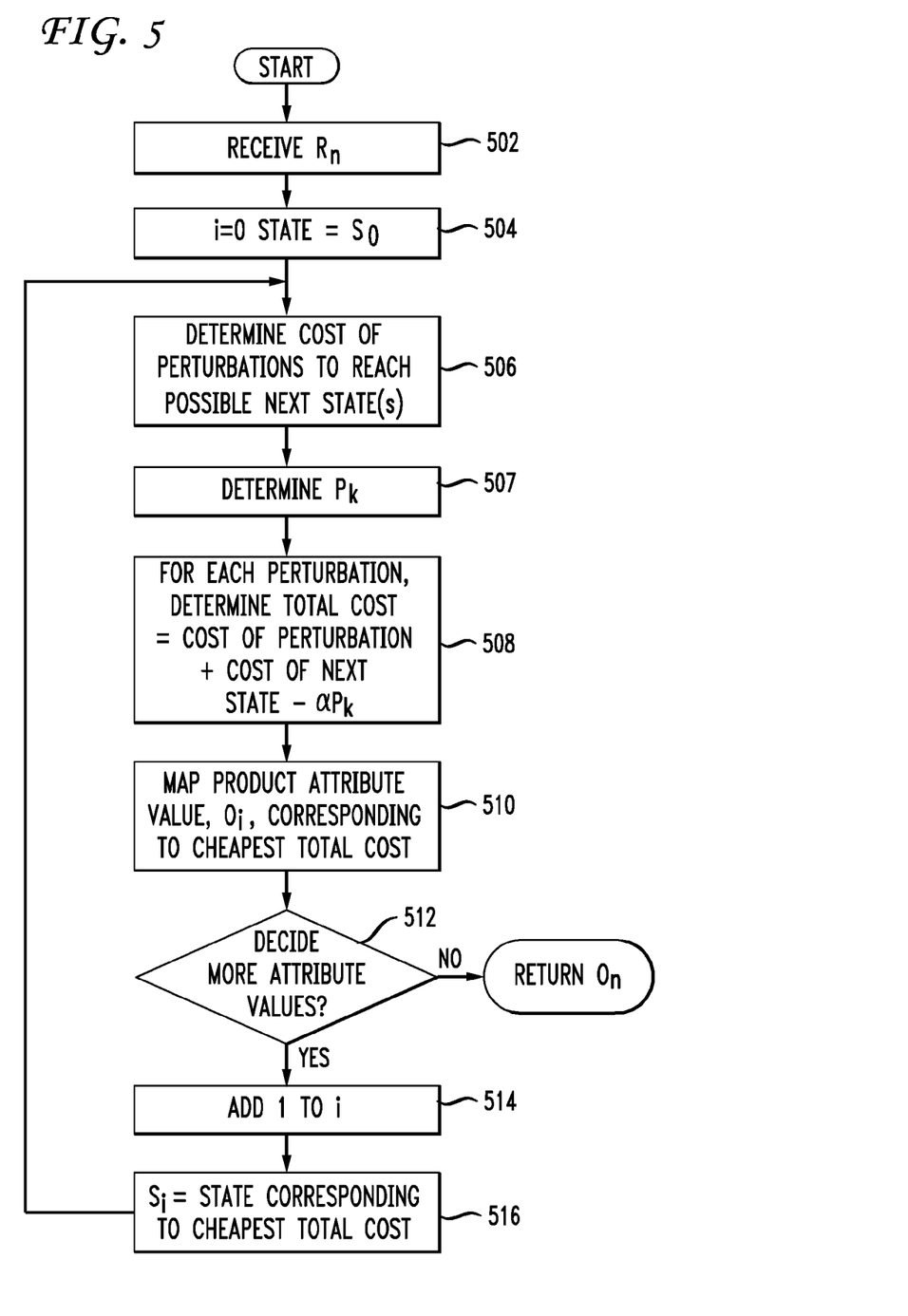
FIG. 5 illustrates another exemplary process for mapping requested product attributes to product attributes of available products in another implementation consistent with the principles of the invention.

FIG. 5 is a flowchart that describes processing in another implementation of processing device 100 consistent with the principles of the invention. Processing device 100 may begin by receiving requested attribute values, $R_n$, for a desired product (act 502). Processing device 100 may then set a counter, i, indicating a number of decided attribute, to 0 and an initial state to $S_0$ (act 504).

Next, processing device 100 may determine a cost of perturbations to reach all possible next states (act 506). For example, if the current state is $S_0=202$, then the set of possible next states is $S_1=\{204, 206, 208\}$. The cost may be determined based on the training data as explained above, with respect to the shoe example. Processing device 100 may then determine a number of products, $P_k$, that have the attributes corresponding to each possible next state (act 507). Processing device 100 may then determine, for each possible next state, a total cost of moving to that state according to a formula $$\text{total\_cost}(S_{i+1}) = c_k^j - \alpha P_k + \text{cost}(S_{i+1}), \quad \text{Equation 3}$$

where $c_k^j$ is a cost of a $k^{th}$ perturbation of a $j^{th}$ attribute, $P_k$ is the number of products that have the decided attribute values, $\alpha$ is a predetermined constant, and $\text{cost}(S_{i+1})$ is the predetermined cost of the next possible state (act 508). Equation 3 assumes that the probability of a consumer purchasing a product when a large number of products have decided attribute values is high. Therefore in this implementation, a cost of transition from one state to another may be reduced by $\alpha P_k$. $\alpha$ in this equation can be calculated empirically. In one implementation, $$\alpha = -\log\left(\frac{P_s}{P_r \times P}\right),$$

where $P$ is the total number of products, $P_s$ is the number of products sold and $P_r$ is the number of products requested in the training data. Processing device 100 may then map a requested product attribute value, $r_i$, to an offered product attribute value, $o_i$, corresponding to the cheapest total cost for which one or more products are available (act 510).

Processing device 100 may then determine whether any additional product attributes values remain to be decided (act 512). If processing device 100 determines that no additional product attribute values remain to be decided, then a set of offered attribute values, $O_n=\{o_1, o_2, \ldots, o_n\}$ are selected and products having attribute values $O_n$ may be offered. Otherwise, 1 is added to i, indicating that an attribute value has been decided (act 514) and the current state, $S_i$, may be set the state corresponding to the cheapest total cost for which one or more products are available (act 516). Processing device 100 may then repeat acts 506-516 until all attribute values are decided. In this way, a cheapest path through the state space is selected based on requested attribute values, $R_n$, the training data, and availability of products.

CONCLUSION

The above-described embodiments are exemplary and are not limiting with respect to the scope of the invention. Embodiments within the scope of the present invention may include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in networked computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

We claim as our invention:

1. A computer-implemented method for learning to map mapping requested product attribute values onto product attribute values of available products, comprising the steps of:

calculating via a processor a cost of a plurality of states of a state space, each of the plurality of states representing one or more available product attributes having zero or more decided attribute values, and calculating the cost is based, at least in part, on training data associated with previously requested and offered products and a summing of an average cost of deciding an attribute value for remaining undecided attributes;

determining a next state of the state space such that one or more products are available and a sum of values, including a cost of the next state and a cost of a perturbation of one or more requested product attribute values to reach the next state is a minimum value, the cost of perturbation being determined according to a formula:

$c_i^k = -\log(p(q_i^k))$, where $c_i^k$ is a cost of a $k^{th}$ perturbation of an $i^{th}$ product attribute value, $q_i^k$ is the $k^{th}$ perturbation of the $i^{th}$ product attribute value, and $p(q_i^k)$ is a probability of selling the product having a value of an $i^{th}$ attribute perturbed according to $q_i^k$, the $k^{th}$ the perturbation the $i^{th}$ product attribute value; and mapping a value for a product attribute according to the minimum sum of values and product attribute values of available products.

2. The method of claim 1, further comprising:

updating a current state to correspond to the determined next state based on the mapped value for the product attribute; and repeating the determining of a next state, the mapping of the value for the product attribute, and the updating of the current state until all of the one or more requested product attribute values are mapped to available product attribute values; and offering the one or more available products having the mapped values of the product attributes.

3. The method of claim 1, wherein the determining of the next state further comprises:

adjusting the sum of values by subtracting a number of available products that have the one or more product attribute values multiplied by a predetermined value.

4. The method of claim 1, wherein the calculating of the cost of the plurality of states further comprises:

for each respective one of the plurality of states, using the training data to determine the average cost of deciding a value of each remaining respective one or more undecided available product attributes; and summing the determined average costs.

5. A tangible machine-readable storage medium having recorded thereon instructions that control at least one processor, the instructions comprising:

instructions for calculating a cost of a plurality of states of a state space, each of the plurality of states representing one or more available product attributes having zero or more decided values, and calculating the cost is based, at least in part, on training data associated with previously requested and offered products and a summing of an average cost of deciding an attribute value for remaining undecided attributes;

instructions for determining a next state of the state space such that one or more products are available and a sum of values, including a cost of the next state and a cost of a perturbation of one or more requested product attribute values to reach the next state is a minimum value, the cost of perturbation being determined according to a formula:

$c_i^k = -\log(p(q_i^k))$, where $c_i^k$ is a cost of a $k^{th}$ perturbation of an $i^{th}$ product attribute value, $q_i^k$ is the $k^{th}$ perturbation of the $i^{th}$ product attribute value, and $p(q_i^k)$ is a probability of selling the product having a value of an $i^{th}$ attribute perturbed according to $q_i^k$, the $k^{th}$ perturbation of the $i^{th}$ product attribute value; and instructions for mapping a value for a product attribute based on a minimum sum of values and product attribute values of available products.

6. The machine-readable medium of claim 1, further comprising:

instructions for updating a current state of the state space to correspond to the determined next state based on the mapped value for the product attribute; and instructions for repeating the determining of a next state, the mapping of the value for the product attribute, and the updating of the current state until all of the one or more requested product attribute values are mapped to available product attribute values; and instructions for offering the one or more available products having the mapped values of the product attributes.

7. The machine-readable medium of claim 5, wherein the instructions for determining the next state further comprise:

instructions for adjusting the sum of values by subtracting a number of available products that have the one or more product attribute values multiplied by a predetermined value.

8. The machine-readable medium of claim 5, wherein the instructions for calculating the cost of the plurality of states further comprise:

instructions for using the training data, for each respective one of the plurality of states, to determine the average cost of deciding a value of each remaining respective one or more undecided available product attributes; and instructions for summing the determined average costs.

9. A processing device comprising:
  at least one processor;
  a storage device including information with respect to a plurality of products, the storage device being accessible by the at least one processor; and
  a memory operatively connected to the at least one processor, wherein the processing device is configured to:
    calculate a cost of a plurality of states of a state space, each of the plurality of states representing one or more available product attributes having decided values, and calculating the cost is based, at least in part, on training data associated with previously requested and offered products and a summing of an average cost of deciding an attribute value for remaining undecided attributes;
    determine a next state of the state space such that one or more products are available and a sum of values, including a cost of the next state and a cost of a perturbation of one or more requested product attribute values to reach the next state, is a minimum value, the cost of perturbation being determined according to a formula:
    $c_i^k = -\log(p(q_i^k))$, where $c_i^k$ is a cost of a $k^{th}$ perturbation of an $i^{th}$ product attribute value, $q_i^k$ is the $k^{th}$ perturbation of the $i^{th}$ product attribute value, and $p(q_i^k)$ is a probability of selling the product having a value of an $i^{th}$ attribute perturbed according to $q_i^k$, the $k^{th}$ perturbation of the $i^{th}$ product attribute value; and
    map a value for a product attribute according the minimum sum of values and product attribute values of available products.

10. The processing device of claim 9, wherein the processing device is further configured to:
  update a current state to correspond to the determined next state based on the mapped value for the product attribute; and
  repeat the determining of a next state, the mapping of the value for the product attribute, and the updating of the current state until all of the one or more requested product attribute values are mapped to available product attribute values; and
  offer the one or more available products having the mapped values of the product attributes.

11. The processing device of claim 9, wherein the processing being configured to determine the next state further comprises the processing device being configured to:
  adjust the sum of values by subtracting a number of available products that have the one or more product attribute values multiplied by a predetermined value.

12. The processing device of claim 9, wherein the processing device being configured to calculate the cost of the plurality of states further comprises the processing device being configured to:
  for each respective one of the plurality of states, use the training data to determine the average cost of deciding a value of each remaining respective one or more undecided available product attributes; and
  summing the determined average costs.

13. A device comprising for learning to map requested product attribute values onto product attribute values of available products, comprising:
  means for calculating a cost of a plurality of states of a state space, each of the plurality of states representing one or more available product attributes having decided values, and calculating the cost is based, at least in part, on training data associated with previously requested and offered products and a summing of an average cost of deciding an attribute value for remaining undecided attributes;
  determining a next state of the state space such that one or more products are available and a sum of values, including a cost of the next state and a cost of a perturbation of one of the one or more requested product attribute values to reach the next state, is a minimum value, the cost of perturbation being determined according to a formula:
  $c_i^k = -\log(p(q_i^k))$, where $c_i^k$ is a cost of a $k^{th}$ perturbation of an $i^{th}$ product attribute value, $q_i^k$ is the $k^{th}$ perturbation of the $i^{th}$ product attribute value, and $p(q_i^k)$ is a probability of selling the product having a value of an $i^{th}$ attribute perturbed according to $q_i^k$, the $k^{th}$ perturbation of the $i^{th}$ product attribute value; and
  means for mapping a value for a product attribute according the minimum sum of values and product attribute values of available products.

14. The device of claim 13, further comprising:
  means for updating a current state of the state space to correspond to the determined next state based on the mapped value for the product attribute;
  means for repeating the determining of a next state, the mapping of the value for the product attribute, and the updating of the current state until all of the one or more requested product attribute values are mapped to available product attribute values; and
  means for offering the one or more available products having the mapped values of the product attributes.

15. The device of claim 13, wherein the means for determining the next state further comprises:
  means for adjusting the sum of values by subtracting a number of available products that have the one or more product attribute values multiplied by a predetermined value.

16. The device of claim 13, wherein the means for calculating of the cost of the plurality of states further comprises:
  means for using the training data, for each respective one of the plurality of states, to determine the average cost of deciding a value of each remaining respective one or more undecided available product attributes; and
  means for summing the determined average costs.

* * * * *